April 5, 1966 E. F. R. A. SCHLOEMANN 3,244,993

ELECTRONICALLY ADJUSTABLE SPIN-WAVE DELAY LINE AND PARAMETRIC AMPLIFIER

Filed Feb. 6, 1962 5 Sheets-Sheet 1

INVENTOR
ERNST F.R.A. SCHLOEMANN

BY [signature]
AGENT

INVENTOR
ERNST F.R.A. SCHLOEMANN
BY [signature]
AGENT

INVENTOR
ERNST F.R.A. SCHLOEMANN
BY [signature]
AGENT

INVENTOR
ERNST F. R. A. SCHLOEMANN
BY [signature]
AGENT

INVENTOR
ERNST F. R. A. SCHLOEMANN
BY
AGENT

United States Patent Office 3,244,993
Patented Apr. 5, 1966

3,244,993

ELECTRONICALLY ADJUSTABLE SPIN-WAVE DELAY LINE AND PARAMETRIC AMPLIFIER

Ernst F. R. A. Schloemann, Stanford, Calif., assignor to Raytheon Company, Lexington, Mass., a corporation of Delaware Filed Feb. 6, 1962, Ser. No. 171,460
15 Claims. (Cl. 330—4.8)

This invention relates generally to delay lines and, in particular, to an electronically adjustable delay line using gyromagnetic material.

The fact that an elastic wave in a solid travels more slowly than a microwave signal in a transmission line has been used in the prior art to make a device which will delay a microwave signal for a given amount of time. These delay lines have generally been of the magnetostrictive or piezoelectric type. Although the speed of an elastic wave in a solid is much slower than the speed of propagation of a microwave signal in a transmission line, it is still on the order of 3 x $10^5$ cm./sec. which means that rather long lines are needed for delays of a hundred microseconds or more.

Briefly, this invention discloses a non-elastic wave delay line which uses the fact that the magnetic field associated with a microwave signal can produce magnetic resonant oscillations in a first portion of a body of gyromagnetic material such as a rod or elongated body of single crystal yttrium iron garnet. Means for producing these oscillations at both high and low power levels are disclosed. Transmission of these oscillations to a second portion of the body can be effected at a relatively slow rate. Output means may then be coupled to a second portion of the body in order to convert the oscillations to an output signal, either microwave or rectified. The group velocity of the oscillations in the body of gyromagnetic material may be on the order of 104 cm./sec., which means that a delay time of 100 microseconds can be accomplished in one centimeter.

Magnetic resonant oscillations may be produced in a body of gyromagnetic material at high frequency input signal levels by signal transmission means which are coupled to the body so that the magnetic field associated with the input signal has a substantial component perpendicular to or parallel with a uniform biasing field. The perpendicular orientation corresponds to "transverse pumping" used in prior art parametric oscillators and the parallel orientation to "longitudinal pumping" comprising application of the magnetic field component of an input electromagnetic microwave energy signal in a direction parallel to the D.-C. biasing magnetic field. The magnetic resonant oscillations produced with either orientation may be converted to an electromagnetic signal but are most conveniently converted to a rectified signal.

This inventor has discovered that magnetic resonant oscillations may be produced at low power levels by producing an inhomogeneous internal field within a portion of a non-ellipsoidal body of gyromagnetic material and orienting the magnetic field associated with the input signal so that it has a substantial component perpendicular or parallel to this internal field. In this way, two difficulties encountered in low-power production of magnetic resonant oscillations, as known in the prior art, are avoided. These difficulties arose because there were only two ways in which to produce the oscillations at low-power levels. One relied on making the electromagnetic field associated with the input signal appreciably non-uniform over the distance corresponding to a wavelength of the magnetic resonant oscillations in the gyromagnetic material. This is difficult to accomplish because the wavelengths of the magnetic resonant oscillations that are of interest in connection with a delay line are typically of the order of 1 micron. The other way is to use "surface pinning" which relies on the surface anisotropy of an extremely thin body of gyromagnetic material. The thinness required severely restricts the usefulness of the body. By using the inhomogeneous internal field within a portion of the body, as disclosed in this invention, a substantially uniform input magnetic field over a body of arbitrary size may be used.

The attenuation of the magnetic resonant oscillations as they are transmitted through the body may be reduced by cooling or by parametric pumping with a pump magnetic field.

The invention will be better understood by reference to the following description taken in conjunction with the appended drawings, wherein.

Figure 1:
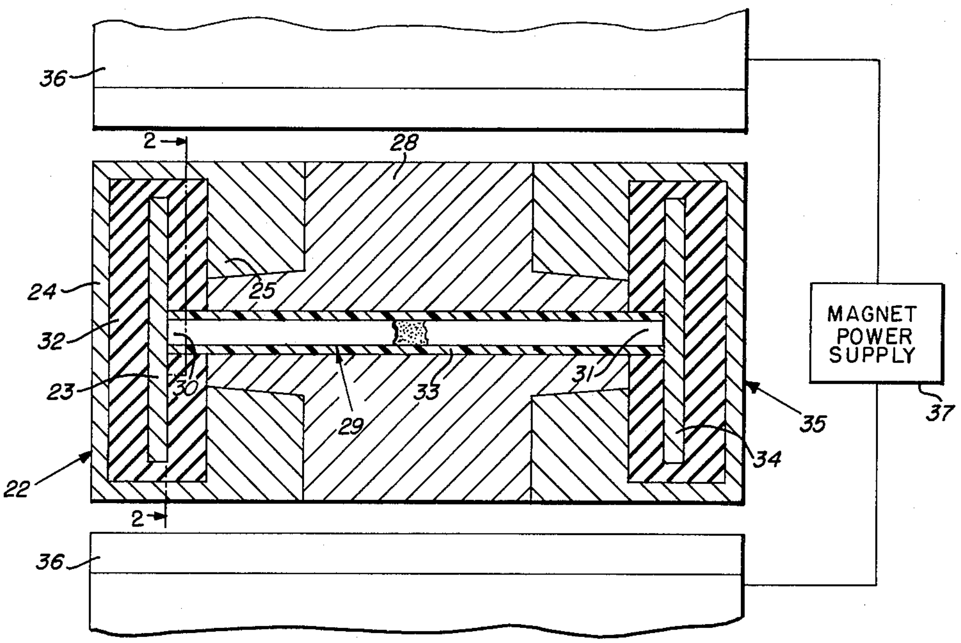
FIG. 1 is a cross-sectional view of a first embodiment of the invention.
Figure 2:
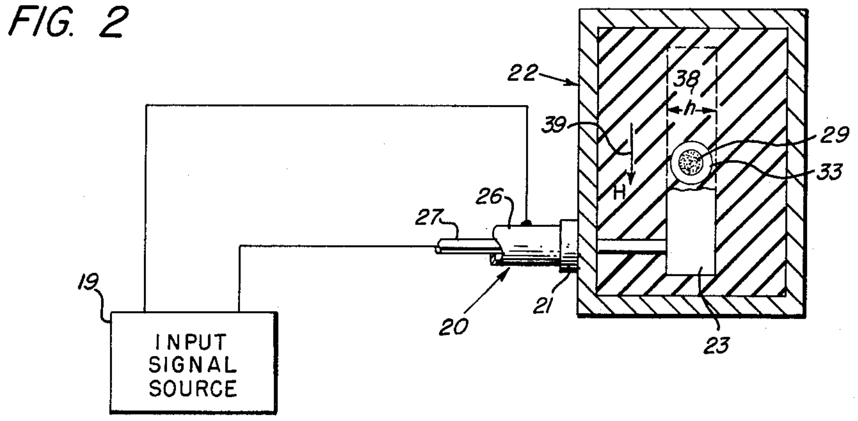
FIG. 2 is a cross-sectional view of the embodiment of FIG. 1 taken along the line 2—2 of FIG. 1.

With reference now to FIGS. 1 and 2, an input signal from an input signal source 19 is coupled by means of a coaxial cable 20 and connector 21 to a resonant input three-element microstrip structure 22. This structure 22 has a center strip 23 and two base planes 24 and 25 which are two opposite walls of the closed structure 22. The outer conductor 26 of the coaxial cable 20 is connected to the base planes 24 and 25 through the microstrip structure 22. The inner conductor 27 of the coaxial cable 20 is connected to the center strip 23. The center strip 23 is made an odd number of half-wavelength long at the input signal frequency so that the magnetic field associated with the input signal is strongest at the center of the strip 23. A structure 28 which supports a rod 29 of gyromagnetic material having flat ends 30 and 31 forms part of base plane 25. The rod of gyromagnetic material 29 extends beyond the structure 28 and is coupled to the center strip 23 at its center. The center strip 23 and the rod 29 may be held in place by a suitable low-loss dielectric 32, such as Teflon. A plastic tube 33, such as a Teflon tube, encases the rod 29 within the structure 28. The other end 31 of the rod 29 is connected to the center strip 34 of a resonant output microstrip structure 35. This microstrip structure 35 is similar to the input microstrip structure 22. An output coaxial cable, not shown, couples an output signal to a load, not shown, in the same manner as the input signal source 19 is connected to the input microstrip structure 22. The assembly 28 which supports the rod 29 is detachable from the structures 22 and 35 so that a rod of different lengths may be used. A magnet 36 which supplies a substantially uniform external biasing magnetic field across the length of the rod 29 is provided, The magnet 36 is energized by a variable magnet supply 37.

In operation, an input signal from an input signal source 19 is coupled to the input structure by means of the coaxial cable 20. Because of the odd half-wavelength characteristic of the center strip 23, the magnetic field associated with the input signal is strongest in the vicinity of the rod 29 of gyromagnetic material. The direction of this magnetic field is indicated by an arrow labeled "*h*" and numbered 38. The orientation of the biasing magnetic field is substantially perpendicular to the magnetic field associated with the input signal and is indicated by an arrow lettered "H" and numbered 39. Because of the shape of the rod, the internal biasing magnetic field is stronger at the ends 30 and 31 of the rod 29 than at the center 40. This inventor has discovered that when the magnetic field associated with the input signal is oriented, as shown, magnetic resonant oscillations are produced in the end portion 30 of the rod 29 of gyromagnetic material. The magnetic oscillations have a frequency which is substantially the same as the input signal. They are transmitted down the rod 29 to its other end 31. At the other end 31, they are reconverted to an electromagnetic signal at the same frequency. This signal is then coupled out.

A theory has been developed which describes how the magnetic resonant oscillations are produced in the rod 29 of gyromagnetic material. According to the theory, the spin of an electron gives rise to a magnetic moment vector which is directed along a spin axis of the electron. As is well known in the art, when the biasing magnetic field is applied to the rod 29 of gyromagnetic material, the spinning electrons precess about the direction of the biasing magnetic field. Cyclical variation of the phases of a number of precessing electron spins give rise to spin modes. The wavelength of spin modes may vary from a large value in the case of what are known as magnetostatic modes to very small values in the case of spin waves. It is the short wavelength spin modes, or spin waves, which are of interest here.

Figure 3:
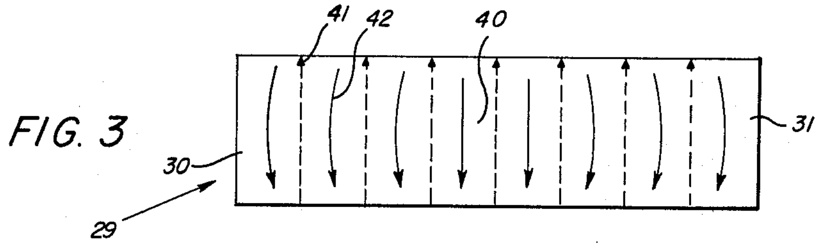
FIG. 3 is a schematic view of the magnetic field in the rod of gyromagnetic material used in the embodiment of FIGS. 1 and 2.

The method of producing spin waves in gyromagnetic material discovered by this inventor is believed to rely on the fact that the demagnetizing field in gyromagnetic bodies with non-ellipsoidal shape is strongly inhomogeneous. The demagnetizing field for a uniformly magnetized, long circular cylinder with flat end faces, such as the rod 29 in FIGS. 1 and 2, is shown schematically in FIG. 3. The rod in FIG. 3 is an enlarged and shortened view of rod 29. However, for clarity, similar elements will be similarly numbered. The dotted lines 41 represent the uniform external biasing magnetic field provided by the magnet 36. The full lines 42 indicate the demagnetizing field. The lines 42 of the demagnetizing field bulge out near the ends 30 and 31. The demagnetizing field in these regions, therefore, is smaller. Hence, the total internal biasing magnetic field which is the difference between the external magnetic field and the demagnetizing field is larger at the ends 30 and 31 than in the interior 40 of the rod 29. Since the effective wavelength of a spin wave is a function of the magnitude of the internal biasing field, the effective wavelength of a spin wave becomes larger as it approaches the ends 30 and 31 of the rod 29. The inhomogeneity created is, in fact, large enough to change the character of the wave function from periodic in the middle of the rod 29 to exponential near the ends 30 and 31. As a result, a spin wave excited in the rod 29 has a net R.F. magnetic dipole moment to which the input signal may be coupled. The same inhomogeneity of the internal magnetic field allows an output signal to be reproduced on the output structure 35 shown at the right side of FIG. 1. This signal may then be coupled out of the device.

The delay caused by this device is a function of the length of the rod 29 and the speed of propagation of spin waves in the rod. The group velocity of a spin-wave packet propagating in the direction of the D.-C. magnetic field is given by the formula:

$$V_g = 2\sqrt{\gamma D(\omega - \gamma H)} \quad (1)$$

wherein Vg is the group velocity, $\omega$ is the angular frequency of the spin waves, $\gamma$ is the gyromagnetic ratio, D is the exchange constant, and H is the magnitude of the internal biasing magnetic field produced in the body which is a function of the external biasing field and the demagnetizing field. It can be seen that varying the external applied field varies the speed of propagation and, therefore, the delay time of the line. If the direction of propagaton does not coincide with the direction of the D.-C. field a formula slightly different from Equation 1 is applicable. (See Equation 5 below.)

Figure 4:
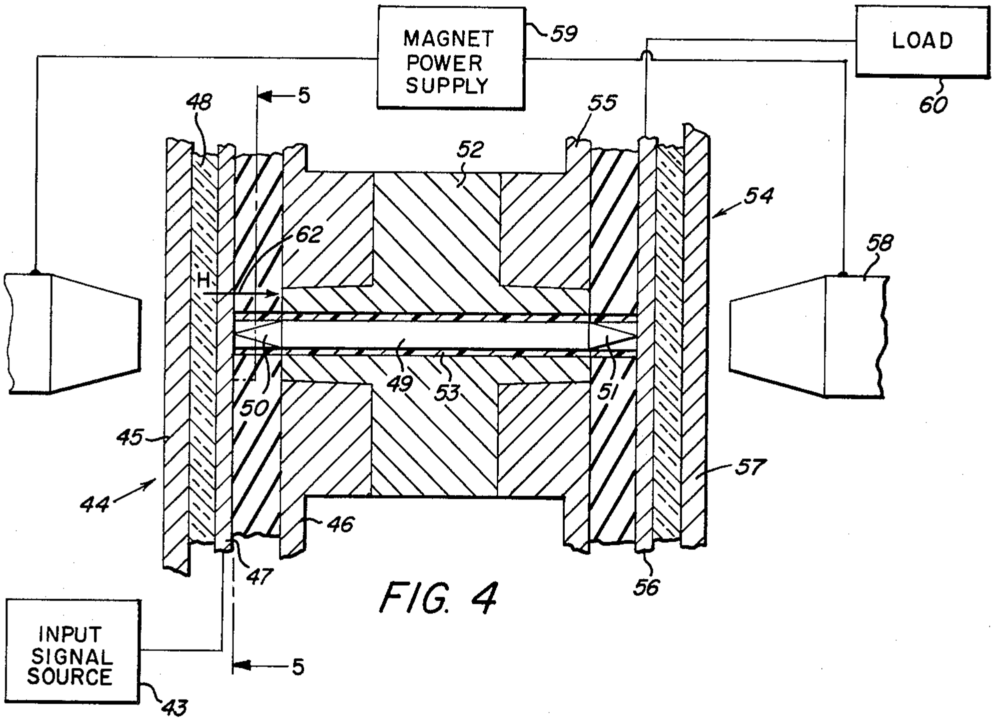
FIG. 4 is a cross-sectional view of a second embodiment of the invention.
Figure 5:
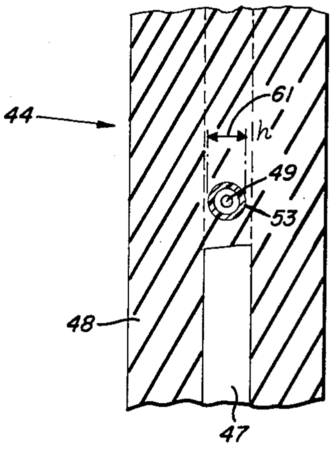
FIG. 5 is a cross-sectional view of the embodiment of FIG. 3 taken along the line 5—5 of FIG. 4.

With reference to FIGS. 4 and 5, an input signal from an input signal source 43 is coupled to a three-element strip transmission line 44. The base planes 45 and 46 are insulated from the center strip 47 by means of a suitable low-loss dielectric 48, such as Teflon. A rod of gyromagnetic material 49 with cone-shaped ends 50 and 51 is supported within a metallic structure 52, which forms a part of base plane 46, by a tube of plastic material 53 so that the cone-shaped end 50 extends into the region between the base plane 46 and the center strip transmission 47. The structure 52 is detachable from the strip line 44 so that rods of different lengths may be used. An output strip transmission line 54 is coupled to the other end of the rod 49 of gyromagnetic material in the same fashion so that the cone-shaped end 51 lies in the region between the base plane 55 and the center strip 56. A second base plane 57 completes the output strip transmission line 54. An electromagnet 58, energized by a variable magnet supply 59, provides a substantially uniform external biasing magnetic field. The output strip transmission line 54 is coupled to a load 60.

In operation, a microwave signal is transmitted down the input transmission line 44. The magnetic field associated with the input signal is represented by an arrow labeled "*h*" in FIG. 5 and numbered 61. The magnetic field produced by the electromagnet 58 is represented by an arrow labeled "H" and numbered 62. The input magnetic field and the biasing magnetic field are thus mutually perpendicular. The inhomogeneous biasing magnetic field within the rod 49 required for production of spin waves in the rod 49 is accomplished in this embodiment by means of the cone-shaped ends 50 and 51. At these ends 50 and 51, the demagnetizing field is strongly inhomogeneous due to the cone shape. Therefore, the internal field at the ends 50 and 51 is in homogeneous. In other respects, this embodiment is similar to that of the embodiment of FIGS. 1 and 2. The input magnetic field produces magnetic resonant oscillations or spin waves which travel down the length of the rod 49 to the output line 54, where they are converted to an output signal which is then coupled to the load 60. The delay time may be adjusted as in the embodiments of FIGS. 1 and 2 by varying the strength of the biasing magnetic field.

Figures 6, 7:
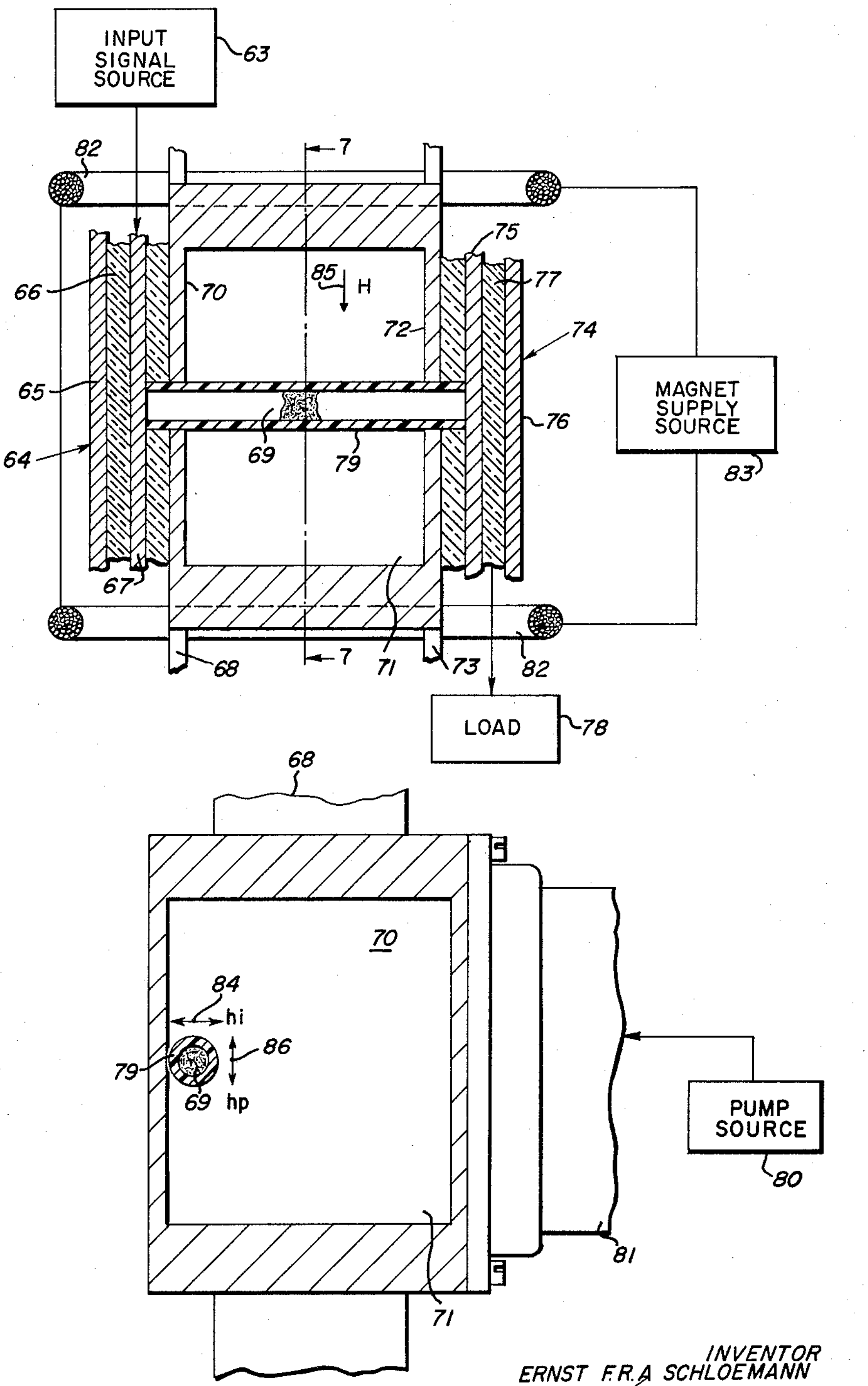
FIG. 6 is a cross-sectional view of a third embodiment of the invention.
FIG. 7 is a cross-sectional view of the embodiment of FIG. 6 taken along the line 7—7 of FIG. 6.

With reference to FIGS. 6 and 7, which is an embodiment of the invention, an input signal from an input signal source 63 is coupled to an input microstrip line 64 which serves as signal transmission means. This line 64 has a first base plane 65 insulated by a suitable material 66 from a center strip 67, and a second base plane 68 similarly insulated. A rod 69 of gyromagnetic material with flat ends passes through base plane 68 of input line 64 and is coupled to the center strip 67 of the input line 64. Part of base plane 68 forms a wall 70 of a microwave cavity 71 through which the rod 69 passes. The rod 69 extends through the cavity 71 and out the opposite wall 72 of the cavity 71. Part of the base plane 73 of an output microstrip line 74 forms wall 72. The rod 69 is then coupled to the center strip 75 of the output line 74. A second base plane 76 completes the output line 74. The base planes 73 and 76 are insulated from center strip 75 by insulating material 77. The output line 74 is coupled to a load 78. The rod 69 is encased in a plastic tube 79 along its length for support. A pump source 80 is coupled to a waveguide 81 which is, in turn, coupled to the cavity 71. The pump source 80 supplies a pump magnetic field to reduce the attenuation of the magnetic resonant oscillations in the section of the rod 69 which passes through the cavity 71. A biasing magnetic field is supplied by Helmholz coils 82 powered by a variable magnet power supply 83. In another embodiment of the invention, the biasing magnetic field may in part be produced by a permanent magnet. In this case only a relatively weak, variable magnetic field must be supplied by the Helmholz coils shown in FIG. 4. This variable field serves to adjust the device to the desired operating point and to vary the delay time.

In operation, production of spin waves takes place in essentially the same manner as it does in the embodiment of FIGS. 1 and 2. The direction of the magnetic field associated with the input signal is indicated by an arrow labeled "$h_i$" and numbered 84. The direction of the biasing magnetic field is indicated by an arrow labeled "H" and numbered 85. It can be seen that this corresponds to the orientation of the fields in the embodiment of FIGS. 1 and 2. The long rod 69 with its flat end faces produces the same inhomogeneity with a biasing magnetic field perpendicular to its length.

The dimensions of the microwave cavity 71 are chosen so that it is resonant at the pump frequency, which is twice the input signal frequency, in a mode having the associated magnetic field in a direction indicated by the arrow labeled "$hp$" and numbered 86. This direction is perpendicular to the axis of the rod 69 and is parallel to the direction of the biasing magnetic field. The magnetic resonant oscillations or spin waves which travel down the length of the rod 69 may then be "longitudinally pumped" by the pump magnetic field. By varying the amplitude of the pump magnetic field, the attenuation of the spin waves may be reduced to any desired extent or the spin waves may be amplified. In this way, the output signal coupled from the output line may have an amplitude equal to or greater than that of the input signal.

A theory which describes how the magnetic resonant oscillations are amplified or their attenuation reduced has been developed. According to this theory optimum performance is obtained if the rod 69 of ferromagnetic material is cut from a single crystal in such a way that certain crystallographic directions are aligned with the axis of the rod and the D.-C. magnetic field. If the ferromagnetic material has cubic crystal structure and a negative first-order cubic anisotropy constant (yttrium iron garnet is an example), a (110) crystallographic direction should coincide with the axis of the rod, and a (1$\bar{1}$0) crystallographic direction should coincide with the direction of the D.-C. magnetic field.

In Table I below there is shown the orientations of the crystallographic axes required for optimum performance which are summarized for cubic and hexagonal materials having a positive or a negative first-order anisotropy constant.

*Table I*

| Crystal structure | First order anisotropy constant | Example | Rod axis parallel to— | D.C. field parallel to— |
|---|---|---|---|---|
| Cubic | $K_1<0$ | Yttrium iron garnet. | (110) | (1$\bar{1}$0). |
| Cubic | $K_1>0$ | Cobalt ferrite | (100) | (011). |
| Hexagonal | $K_1<0$ | "Ferroxplana" | Hexagonal axis. | Basal plane. |
| Hexagonal | $K_1>0$ | "Ferroxdure" | Basal plane | Basal plane. |

The effect of the pump magnetic field can be explained best in terms of the magnetic moment vector which is a combination of the individual electron magnetic moments and will here be considered to be a function of the radius vector, that characterizes the position of an arbitrary point within the sample. In general, the magnetic moment vector will describe a noncircular cone of precession at each point in the sample if a spin wave is excited within the sample. The ellipticity arises from internal demagnetizing fields and from crystalline anisotropy. The demagnetizing field is similar to the depolarization field which arises when a dielectric is placed in a uniform electric field. Because of the internal demagnetizing field the restoring force that acts on the magnetic moment vector is strongest in the direction of propagation of the spin wave and weakest in a direction perpendicular to this axis. This results in a cone of precession which is elongated in a direction perpendicular to the direction of propagation. If the crystallographic orientation of the rod 69 agrees with that in Table I and if the direction of propagation coincides with the direction of the rod axis, the effect of crystalline anisotropy on the ellipticity of the spin precession enhances the effect of the internal demagnetizing field. On the other hand, the crystalline anisotropy reduces the effect of the internal demagnetizing field, if the direction of propagation is perpendicular to the rod axis.

The pump magnetic field associated with the input signal pumps the precessional motion of the magnetic moment vector along its elliptical path. Since the magnetic moment vector does not change its length when describing its elliptical cone of precession, the component of the magnetic moment vector which is parallel to the static magnetic field will oscillate as the tip of the magnetic moment vector follows the cone of precession. The frequency of this oscillation equals twice the precession frequency. If the pump magnetic field has a frequency which is substantially equal to the frequency of this oscillation, that is twice the precession frequency of the magnetic moment vector, and is phase properly, it will drive this oscillating component, thereby causing the magnetic moment vector to describe a cone of precession with a larger precession angle. Since the precession angle of the cone of precession is directly related to the amplitude of the spin wave, increasing this angle is equivalent to increasing the amplitude of the spin wave. The spin wave may thus have its attenuation reduced or, if losses are overcome, amplified. This parametric excitation mechanism is the more efficient the larger the ellipticity of the spin precession. With crystal orientation, the spin waves which propagate along the axis of the rod have the largest ellipticity and hence are most strongly affected by the pump field.

It can, thus, be seen that the embodiment of FIGS. 6 and 7 is essentially the embodiment of FIGS. 1 and 2 with the addition of a traveling wave parametric amplifier. In the embodiment of FIGS. 4 and 5, attenuation may also be reduced by pumping. This is most conveniently done by the method of "transverse pumping" referred to above. The same type of cavity used in the embodiment of FIGS. 6 and 7 would be used.

Figures 8, 10:
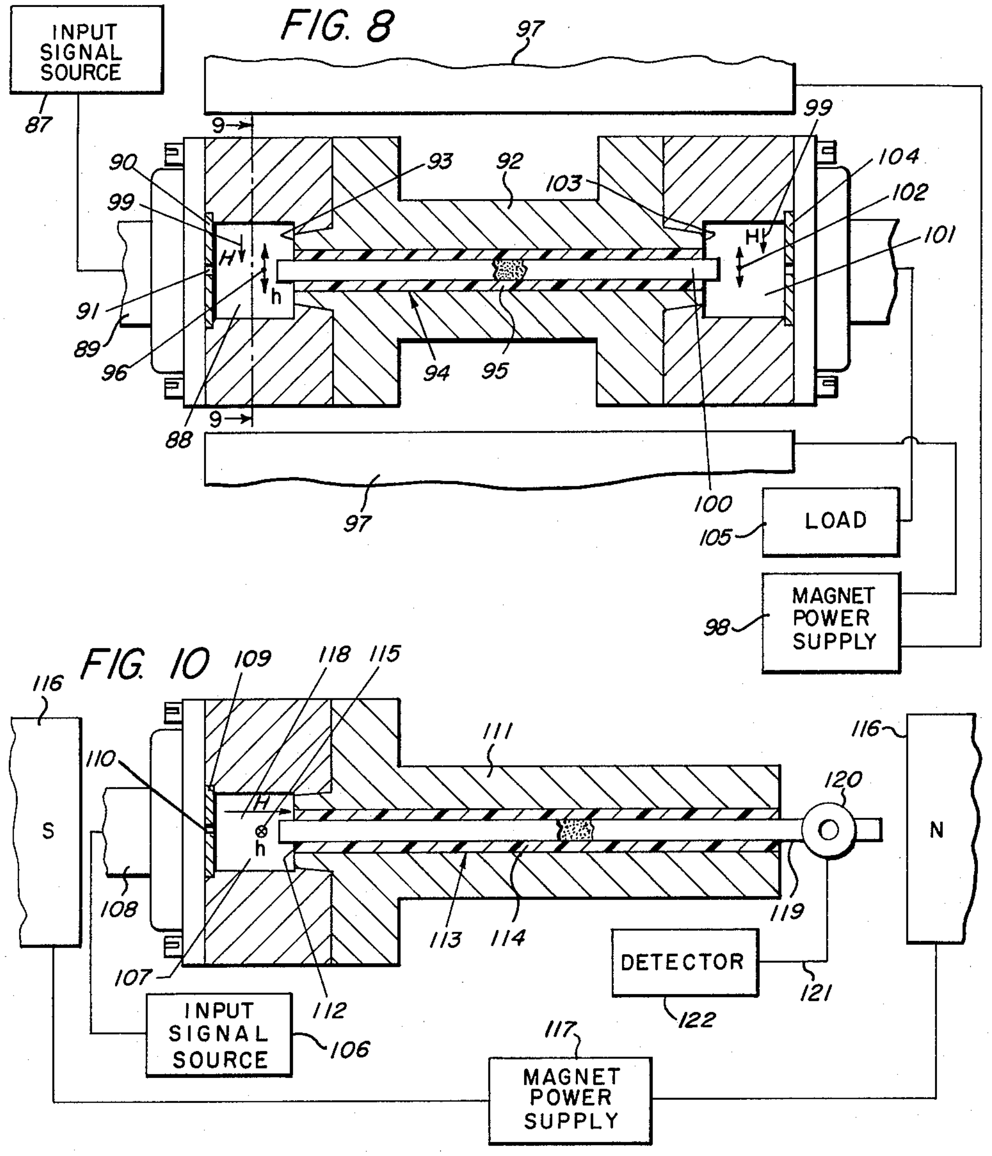
FIG. 8 is a cross-sectional view of a fourth embodiment of the invention.
FIG. 10 is a cross-sectional view of a fifth embodiment of the invention.
Figure 9:
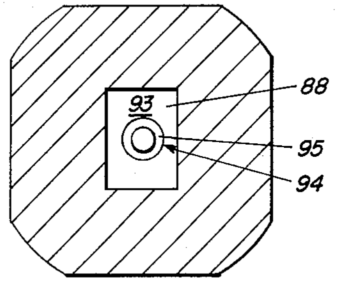
FIG. 9 is a cross-sectional view of the embodiment of FIG. 8 taken along the line 9—9 of FIG. 8.

With reference to FIGS. 8 and 9, a fourth embodiment of the invention is shown. An input signal from an input signal source 87 is coupled to a cavity 88 by means of a waveguide 89 and an iris 90. The iris 90 is made of a conducting sheet and has a central hole 91 and may be removed for substitution of a second sheet having a slightly different diameter hole 91 so that the coupling between the waveguide 89 and the cavity 88 may be made optimum. A detachable assembly 92 forms part of the wall 93 of the cavity 88 opposite the iris 90. In this detachable assembly 92 is mounted a rod 94 of gyromagnetic material supported by an encircling plastic tube 95. The rod 94 of gyromagnetic material extends a short distance out beyond the wall 93 into the cavity 88. The cavity 88 is constructed in accordance with requirements well known in the art so that it is resonant at the input signal frequency and has a magnetic field which is oriented in the vicinity of the rod of gyromagnetic material in a manner indicated by the arrow labeled "*h*" and numbered 96. A biasing magnetic field is provided by a magnet 97. This magnet is energized by a magnet supply source 98. The orientation of this magnetic field is substantially parallel to the input magnetic field in the vicinity of the rod 94 and is indicated by the arrow labeled "H" and numbered 99. The detachable assembly 92 supports the rod 94 of gyromagnetic material for most of its length. The opposite end 100 of the rod 94 extends a short distance into a second cavity 101 which is resonant at the frequency of the input signal in a mode which has a magnetic field having a direction indicated by an arrow 102. The direction of the biasing magnetic field is indicated as before by an arrow labeled "H" and numbered 99. As in the cavity 88, these directions are substantially parallel. The detachable assembly forms part of the wall 103 of this cavity. Opposite wall 103 is an iris 104, similar to iris 90, which permits an output signal to be coupled to a load 105. A cross-section of the device of FIG. 8 taken on line 9—9 thereof is shown in FIG. 9.

In operation, an input signal from an input signal source 87 is coupled by means of the waveguide 89 and iris 90 to the cavity 88. Magnetic resonant oscillations are produced in the rod of gyromagnetic material when the strength of the input signal exceeds a critical amplitude. The method of production is the same as that used to amplify the spin waves in the embodiment of FIGS. 6 and 7. In this embodiment, spin waves existing in the body 94 because of thermal excitations are enhanced by the parametric excitation mechanism, while in the embodiment of FIGS. 6 and 7, the spin waves are produced by the mechanism described in FIGS. 1 and 2.

The frequency of the spin wave which is excited depends upon the frequency of the exciting magnetic field. This frequency is one-half that of the frequency of the signal from the input signal source 87. The wave number or inverse wavelength of the spin modes is given by the formula:

$$DK_{sp}^2=Hc-H;\ \text{for}\ H<H_c \quad (2)$$

in which D is the exchange constant, $K_{sp}$ is the wave number of the spin mode, H is the strength of the biasing magnetic field and $$H_c=2\pi M+[(\omega_p/2\gamma)^2+(2\pi M)^2]^{1/2} \quad (3)$$

is the characteristic value of H at which $\frac{1}{2}\pi$ directed spin waves have zero wave number. D for yttrium iron garnet equals $4.4\times10^{-9}$ oersted cm.$^2$. The wave number of the spin modes thus varies with the strength of the biasing magnetic field. As the magnetic field strength is decreased away from the value of $H_c$, the wave number of the spin waves increases.

The amplitude of the input signal which is required in order to drive the spin waves into oscillation must be of a value great enough to overcome internal losses. However, for stable oscillations, it should not be great enough to overcome the external losses in the system. The actual value will depend upon the Q of the cavity 88 and the coupling coefficients.

The magnetic resonant oscillations travel down the rod 94 to the second cavity 101, which is resonant at the frequency of the input signal, where they are reconverted back to an electromagnetic signal by the reverse of the generation mechanism and coupled out to load 105.

The delay time may be varied by varying the strength of the biasing magnetic field. Since this varies the wave number of the spin waves and since the frequency is constant, the velocity of the waves varies with the wave number. The relationship between phase velocity, frequency and wave number is:

$$V_{ph}=\frac{\omega}{K_{sp}} \quad (4)$$

where $V_{ph}$ is the phase velocity, $\omega$ is the angular frequency, and $K_{sp}$ is the wave number. On the other hand the group velocity of spin waves propagating perpendicular to the D.-C. field is given by:

$$Vg=2\gamma[D(H_c-H)]^{1/2}[1+(\omega_m/2\omega_k)^2]^{1/2} \quad (5)$$

With reference, now, to FIG. 10, a fifth embodiment of the invention is shown. An input signal from an input signal source 106 is coupled to a cavity 107 by means of a waveguide 108 and an iris 109. The iris 109 comprises a conducting sheet with a central hole 110 and may be removed for substitution of a second sheet having a slightly different diameter hole so that coupling between the waveguide and the cavity 107 may be made optimum. A detachable assembly 111 forms part of the wall 112 of the cavity 107 opposite the iris 109. In this detachable assembly 111 is mounted a rod 113 of gyromagnetic material enclosed by a plastic tube 114, such as Teflon tubing. One end of the rod 113 of gyromagnetic material extends a short distance out beyond the wall 112. The cavity 107 is resonant at the input signal frequency and has a magnetic field which is oriented in the vicinity of the rod of gyromagnetic material in a manner indicated by the arrow labeled "h" and numbered 115. A biasing magnetic field is provided by a solenoid or magnet 116. This solenoid is energized by a variable magnet power supply 117. The orientation of this magnetic field is substantially perpendicular to the input magnetic field and is indicated by the arrow labeled "H" and numbered 118. The detachable assembly 111 supports the rod 113 of gyromagnetic material for most of its length. However, the right end 119 of the rod 113 extends a short distance beyond the detachable assembly 111. One or more pick-up coils 120 are located at this end 119 of the rod 113. A spin wave packet traveling down the rod will induce a rectified voltage in these coils. The leads 121 from the pick-up coils 120 are connected to a detector 122.

A cross-section of the embodiment of FIG. 10 through cavity 107 is substantially similar to FIG. 9. In operation, an input signal from the input signal source 106 is coupled by means of the waveguide 108 and iris 109 to the cavity 107. Magnetic resonant oscillations are produced in the rod of gyromagnetic material when the strength of the input signal exceeds a critical amplitude This is essentially the same mechanism as transverse pumping. These magnetic resonant oscillations are transmitted down the length of the rod 113 to the end 119. These magnetic resonant oscillations or spin waves are directed parallel to the biasing magnetic field in a direction parallel to the axis of the rod 113 and have a frequency which is equal to that of the input signal. The spin waves change the longitudinal magnetization of the rod 113, and, therefore, induce a voltage in the pick-up coils 120. In this manner, a rectified signal may be produced in the detector 122. The pick-up coil 120 is useful when a conversion back to a microwave signal is not needed. However, as in the embodiment of FIGS. 4 and 5, a microwave signal may be produced by leading the end 119 of the rod 113 into a cavity resonant at the frequency of the input signal. Within this cavity, the magnetic field of the resonant mode should be in the same direction as the arrow "*h*" in FIG. 10 and the solenoid 116 should be large enough to produce a biasing magnetic field across end 119 of rod 113 as well as the end in cavity 107. If a microwave output is desired the tip of the rod protruding into the output cavity should have a sharp point such as indicated in FIG. 4, in order to improve the coupling.

It is also clear that the pick-up coil 120 in FIG. 10 could be used in the embodiment of FIGS. 8 and 9 if a rectified signal were desired.

Figure 11:
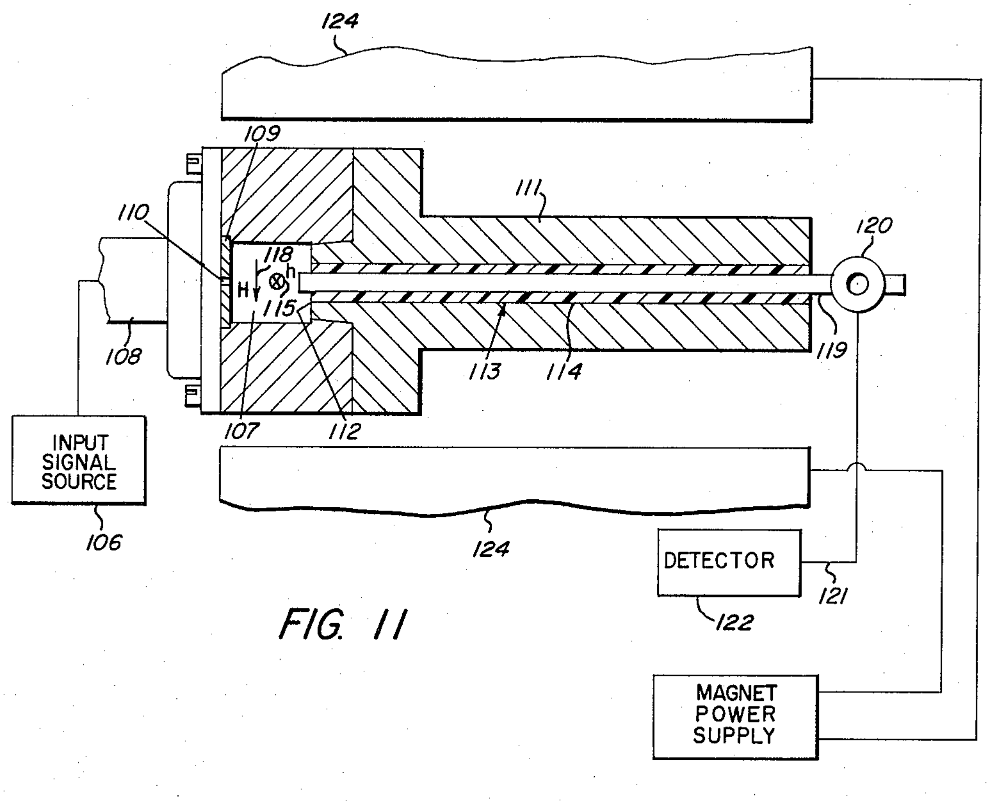
FIG. 11 is a cross-sectional view of a sixth and preferred embodiment of the invention.

FIG. 11 shows still another embodiment of the invention. This embodiment combines the main body of the unit shown in FIG. 10 with the magnetizing device of FIG. 8. Thus, if we extract the main unit from FIG. 10 and place a magnet 124, similar to magnet 97 of FIG. 8, parallel to the gyromagnetic rod 113, we have still another example of the utilization of this invention.

In all of the embodiments, operation may be improved by cooling the rod of gyromagnetic material. This reduces the attenuation of the spin waves in the gyromagnetic material provided that a material such as very pure yttrium-iron garnet is used. This cooling may be done, for example, by immersing the sample in a bath of a liquid such as nitrogen or helium.

In the embodiment of FIGS. 1 and 2, it is obvious that the strip transmission line structures need not have been resonant. The same strip transmission line structure can be used with the embodiment of FIG. 1, in which the magnetic field is perpendicular to the axis of the rod, as was used in FIGS. 4 and 5, in which the magnetic field is parallel to the axis of the rod. Similarly, the embodiments of FIGS. 6 and 7, and 8 and 10 represent only two of the possible ways in which microwave energy may be coupled to a rod of gyromagnetic material. Other variations will become apparent to those skilled in the art. It should also be noted that the method of obtaining a rectified signal in the embodiment of FIG. 10 may be used with other embodiments.

This completes the description of the invention. However, many modifications of the invention will be apparent to persons skilled in the art. Accordingly, it is desired that this invention not be limited except as defined by the appended claims.

What is claimed is:

1. In combination:

a non-ellipsoidal body of gyromagnetic material with the dimension along its longitudinal axis exceeding the dimension transverse to said axis;

means for applying an exciting magnetic field of an input microwave frequency signal and a uniform external D.-C. biasing magnetic field to at least a first portion of said body; said exciting and biasing magnetic fields having a magnitude required to produce magnetic resonant oscillations in the spin wave mode of propagation in said first portion;

means for effecting the transmission of said oscillations to a second portion of said body;

means for varying the magnitude of said biasing magnetic field to vary the wave number of said oscillations and control the speed of propagation through said body;

and output microwave frequency signal means coupled to said second portion.

2. In combination:

a non-ellipsoidal body of gyromagnetic material with the dimension along its longitudinal axis exceeding the dimension transverse to said axis;

means for applying a uniform external D.-C. biasing magnetic field to said body to produce an inhomogeneous internal D.-C. magnetic field;

means for applying an exciting magnetic field of an input microwave frequency signal to at least said first portion, said magnetic field having a substantial component perpendicular to said biasing magnetic field;

said exciting and biasing fields having a magnitude required to produce magnetic resonant oscillations in the spin wave mode of propagation in said first portion;

means for effecting transmission of said oscillations to a second portion of said body;

means for varying the magnitude of said biasing magnetic field to vary the wave number of said oscillations and control the speed of propagation through said body; and output microwave frequency signal means coupled to said second portion.

3. The combination according to claim 2 wherein said external D.-C. biasing magnetic field is applied perpendicular to the longitudinal axis of said body.

4. The combination according to claim 2 wherein said external D.-C. biasing magnetic field is applied parallel to the longitudinal axis of said body.

5. The combination according to claim 2 wherein said body of gyromagnetic material comprises a rod of single crystal yttrium iron garnet.

6. In combination:

a resonant cavity tuned to a predetermined frequency;

a non-ellipsoidal body of gyromagnetic material with the dimension along its longitudinal axis exceeding the dimension transverse to said axis extending into said cavity;

means for applying a uniform external D.-C. biasing magnetic field perpendicular to the longitudinal axis of said body to produce an inhomogeneous internal D.-C. magnetic field;

means for applying an exciting magnetic field of an input microwave frequency signal in a direction perpendicular to said biasing magnetic field to at least said first portion of said body;

means for applying a pump microwave signal at a frequency twice that of said input signal to said resonant cavity, said pump signal having a magnetic field component oriented parallel to said biasing magnetic field;

said exciting and biasing fields having a magnitude required to produce magnetic resonant oscillations in the spin wave mode of propagation; and said pump magnetic field having a magnitude for parametrically amplifying said oscillations;

means for varying the magnitude of said biasing magnetic field to vary the wave number of said amplified oscillations and control the length of time of propagation through said body; and output microwave frequency signal means for extracting delayed signals from said body.

7. The combination according to claim 6 wherein said body of gyromagnetic material comprises a rod of single crystal yttrium iron garnet with the (110) crystallographic direction axis parallel to the longitudinal axis and the $(1\bar{1}0)$ crystallographic direction axis parallel to the biasing magnetic field.

8. A microwave frequency delay line comprising:

a non-ellipsoidal body of gyromagnetic material with the dimension along its longitudinal axis exceeding the dimension transverse to said axis;

means for applying a uniform external D.-C. biasing magnetic field perpendicular to the axis of said body to produce an inhomogeneous internal magnetic field;

means for applying an exciting magnetic field of an input microwave frequency signal to said body, said magnetic field having a substantial component perpendicular to said biasing magnetic field;

said exciting and biasing fields having a magnitude required to produce magnetic resonant oscillations in the spin wave mode of propagation and a group velocity $V_g$ determined in accordance with the equation:

$$Vg=2\sqrt{\gamma D(\omega-\gamma H)}$$

where:

$\omega$=angular frequency of spin wave $\gamma$=gyromagnetic ratio $D$=exchange constant $H$=magnitude of inhomogeneous internal magnetic field;

means for varying the magnitude of said external biasing magnetic field to vary the group velocity of said oscillations and control the speed of propagation through said body; and output microwave frequency signal means coupled to said body for extracting the delayed microwave signals.

9. A microwave frequency delay line according to claim 8 wherein said body comprises a rod of single crystal yttrium iron garnet having flat end faces.

10. A microwave frequency delay line according to claim 8 wherein said input and output microwave frequency signal means comprise strip transmission line conductors with the center conductor contacting the ends of said body.

11. A microwave frequency delay line according to claim 8 wherein said input and output microwave signal frequency means comprise waveguide cavities resonant at the frequency of the input signal frequency.

12. A microwave frequency delay line comprising:

a non-ellipsoidal body of gyromagnetic material with the dimension along its longitudinal axis exceeding the dimension transverse to said axis;

means for applying a uniform external D.-C. biasing magnetic field parallel to the axis of said body to produce an inhomogeneous internal magnetic field;

means for applying an exciting magnetic field of an input microwave frequency signal to said body; said magnetic field having a substantial component perpendicular to said biasing magnetic field;

said exciting and biasing fields having a magnitude required to produce magnetic resonant oscillations in the spin wave mode of propagation and a group velocity $V_g$ determined in accordance with the equation:

$$Vg=2\gamma[D(H_c-H)]^{1/2}[1+(\omega M/2\omega_k)^2]^{1/2}$$

where:

$\gamma$=gyromagnetic ratio $\omega$=angular frequency of spin wave $D$=exchange constant $H$=magnitude of the inhomogeneous internal magnetic field;

means for varying the magnitude of said external biasing magnetic field to vary the group velocity of said oscillations and control the speed of propagation through said body; and output microwave frequency signal means coupled to said body for extracting the delayed microwave signals.

13. A microwave frequency delay line according to claim 12 wherein said body comprises a rod of single crystal yttrium iron garnet having flat end faces.

14. A microwave frequency delay line according to claim 12 wherein said input and output microwave frequency signal means comprise strip transmission line conductors with the center conductor contacting the ends of said body.

15. A microwave frequency delay line according to claim 12 wherein said input and output microwave signal frequency means comprise waveguide cavities resonant at the frequency of the input signal frequency.

References Cited by the Examiner

UNITED STATES PATENTS

| | | | |
|---|---|---|---|
| 2,825,765 | 3/1958 | Marie | 330—5 |
| 3,012,203 | 12/1961 | Tien | 330—4.6 |
| 3,012,204 | 12/1961 | Dransfeld et al. | 330—4.6 |
| 3,022,466 | 2/1962 | Weiss | 330—4.8 |

FOREIGN PATENTS

| | | |
|---|---|---|
| 1,228,390 | 3/1960 | France. |

OTHER REFERENCES

"Advances in Quantum Electronics," edited by Singer, Columbia University Press, New York, 1961, pps. 427–434 (article by Turner) and 437–452 (article by Schlosmann), copy in Scientific Library and Div. 72.

ROY LAKE, *Primary Examiner.*

ARTHUR GAUSS, *Examiner.*

D. R. HOSTETTER, *Assistant Examiner.*